United States Patent Office 2,933,016
Patented Apr. 19, 1960

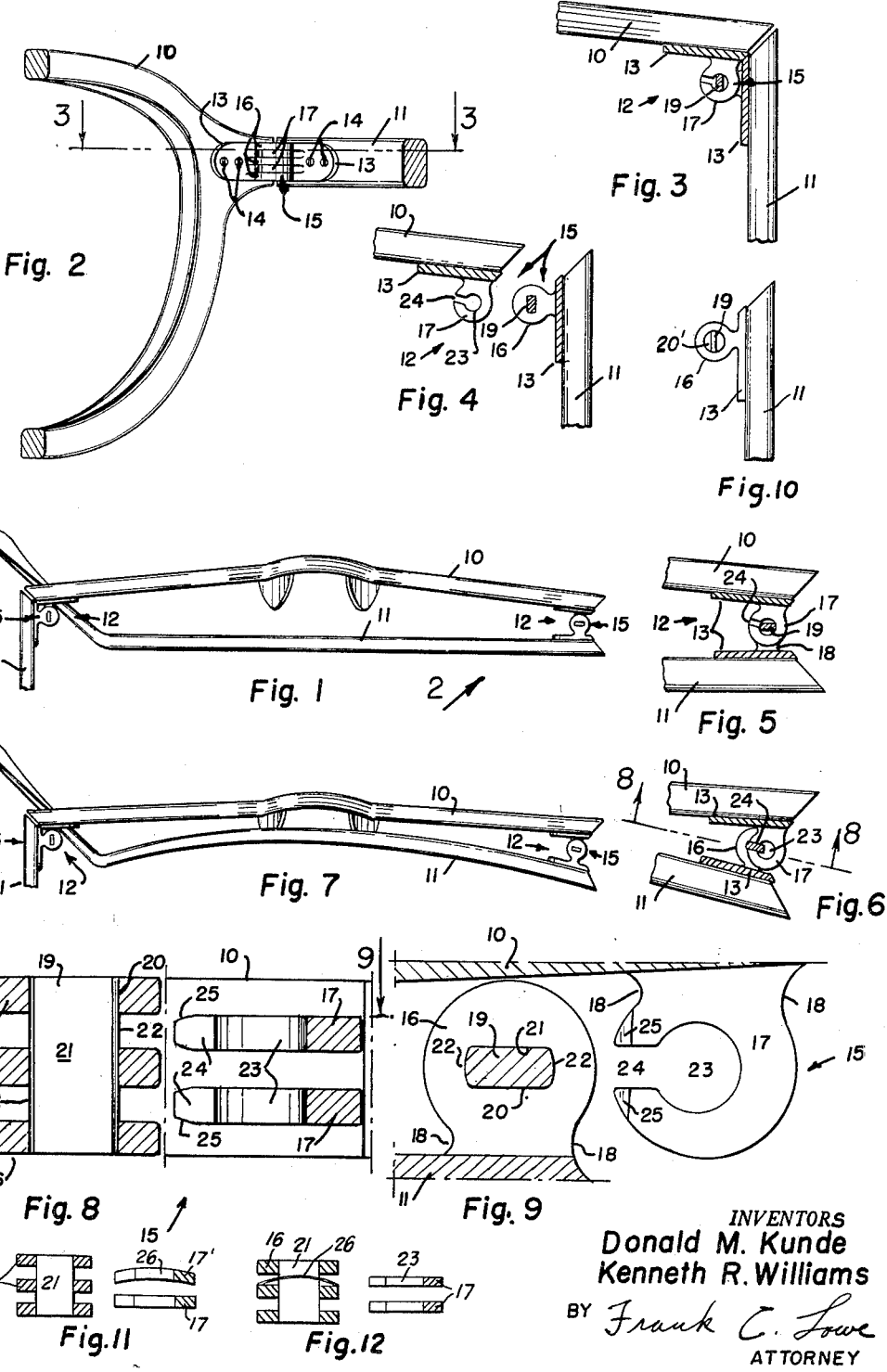

2,933,016

TEMPLE HINGE FOR EYEGLASSES

Donald M. Kunde and Kenneth R. Williams,
Denver, Colo.

Application December 15, 1954, Serial No. 475,432

3 Claims. (Cl. 88—53)

This invention relates to spectacles or eyeglasses, and more particularly to the structural frames of ordinary eyeglasses, of the type which comprise a lens-holding front frame having ear bows or temples attached to each side of the frame by small hinges, the respective elements being hereinafter referred to as the front frame, temples and hinges.

A primary object of the invention is to provide a novel and improved hinge for eyeglasses, and other objects of the invention are to provide such a hinge which; (a) is formed of only two elements, a pair of leaves which are pivotally interconnectable without pivot pins or the like which tend to become loosened, disconnected and even lost; (b) is formed as a pair of leaves adapted to be interconnected by a quick, simple operation to permit the assembly of a temple to the front frame; (c) permits, in mass production operations for the manufacture of eyeglass frames at a substantial savings in the time required for the assembly of the temples to the front frame; (d) permits a temple to be removed from the front frame quickly and easily when desirable to replace or exchange the temple; (e) permits a change of temples without any tools whatsoever, and by persons having little finger skill; (f) permits a person having poor eyesight to quickly replace a broken temple on his glasses; (g) permits an individual to have various styles of temples for various occasions; (h) although permitting easy removal of a temple from a frame, is adapted to prevent an accidental removal therefrom; (i) may be of the same proportions as conventional pin type hinges and fit in ordinary hinge mounting sockets on front frames and temples; and is simple in construction, easy to manufacture, a low cost article, neat in appearance, reliable in use, and comparatively rugged and durable.

With the foregoing and other objects in view, all of which more fully hereinafter appear, our invention comprises certain novel and improved constructions, combinations and arrangements of parts and elements as hereinafter described, and as defined in the appended claims and illustrated in the accompanying drawing, in which:

Figure 1 is a plan view of an eyeglasses frame with the right temple folded against the front frame in a normally retracted position, with the left temple at right angles thereto in an extended position, portions of the left temple being broken away to conserve space, and with our improved hinges attaching the temples to the front frame.

Figure 2 is an enlarged fragmentary elevation view of a portion of the front frame, a portion of the right temple in extended position and the hinge, all as viewed from the inward side of the frame, substantially from the indicated arrow 2 at Fig. 1.

Figure 3 is a plan view of the fragmentary portion illustrated at Fig. 2, but with the hinging elements in section, as taken substantially on the indicated line 3—3 at Fig. 2.

Figure 4 is a plan view similar to Fig. 3, but with the temple disconnected from the front frame.

Figure 5 is a plan view similar to Fig. 3, but with the right temple folded to the normally retracted position, such as illustrated at Fig. 1.

Figure 6 is a plan view similar to Fig. 5, but with the right temple folded beyond the normally retracted position to a position for disconnection of the temple from the frame at the hinge and with the temple being partially disconnected.

Figure 7 is a plan view of the eyeglasses similar to Fig. 1, but illustrating the folding of the right temple beyond the normally retracted position to the position of disconnection illustrated at Fig. 6.

Figure 8 is a fragmentary sectional detail of hinge elements as viewed substantially from the indicated line 8—8 at Fig. 6, but on a further enlarged scale and with the hinge elements fully separated.

Figure 9 is a fragmentary sectional detail as viewed from the indicated line 9—9 at Fig. 8.

Figure 10 is a plan view of the hinge element similar to the temple leaf shown in Fig. 4, but illustrating a modified construction thereof.

Figure 11 is a fragmentary sectional detail similar to Fig. 8, but on a reduced scale and illustrating another modification thereof.

Figure 12 is a fragmentary sectional detail similar to Fig. 11, but illustrating another modification thereof.

Referring more particularly to the drawing, the eyeglasses comprise a conventional lens-holding front frame 10 and temples 11 at each side thereof which are swingably interconnected to the frame 10 by the improved hinges 12. These hinges 12 are generally formed similar to conventional hinges ordinarily used for the connection of the temples 11 to the frame 10, each hinge being formed by two pivotally interconnected leaves, and with each leaf including a leg 13 which is attached to the end of the frame or to a temple as by screws 14, all in a conventional manner. The pivotal connection of the two leaves is formed by an array of spaced, disc-shaped fingers outstanding from an end of the leg of each leaf which are adapted to intermesh with the fingers of the mating leaf to form a barrel-shaped connection having a pivot axis extending therethrough and such intermeshed elements will be hereinafter referred to as the pivot barrel 15.

The hinge 12 at each side of the front frame 10 is of substantially identical construction as the opposing hinge, but inversed with respect thereto, providing, in substance, a right-left handed arrangement, and with such in view, the description will be hereinafter related to the right hinge illustrated.

Our improvement lies in the construction of the pivot barrel 15 and the manner in which the fingers 16 of the temple leaf are pivotally interconnected with the fingers 17 of the frame leaf to form the hinge. In a preferred construction, there will be an odd number of fingers with the temple leaf fingers 16 and frame leaf fingers 17 alternately intermeshing and preferably with the frame leaf fingers being the lesser number and thereby being encased within the temple leaf fingers 16. The total number of fingers may thus be three, five or seven or the like, the drawing depicting five such fingers. However, it is to be understood that the scope of the invention would permit a departure from such preferred arrangements.

The temple leaf fingers 16 are each disc shaped and are centered on a common axis and spaced in a manner which provides snug reception of the frame leaf fingers therebetween. The fingers 16 are each attached to their hinge leg 13 to outstand in unison from one side thereof and such connection is reinforced by fillets 18 at each side of the connecting point of each finger to provide a sturdy construction. A flat bar 19 having a width substantially greater than its thickness extends through this group of fingers 16 through suitable rectangular orifices 20 in each finger which are axially centered with respect to the pivot axis of the group to thereby so center the bar. The flat surfaces 21 of the bar are oriented to be in substantial spaced parallelism with the adjacent surface of the leg 13. The width of this bar 19 is such that it is adapted to rotatably fit in orifices in the frame leaf fingers, hereinafter described, and the edges 22 are suitably rounded with rounded corners to provide a snug, full-faced fit in such hereinafter described orifices.

The rectangular orifices 20 in each finger 16 may be formed in a conventional manner by punching or with a suitable broaching tool and it is contemplated that the bar 19 will be permanently fitted therein and securely fastened to at least one of the fingers 16, as by a press fit or by soldering with silver solder or the like. Other steps may be used to form this bar 19 between the fingers, as for example, the bar may be integral with the fingers with the portions of the bar 19 between the fingers being milled to shape. Another method is to provide circular shaped orifices 20' in the fingers 16 of such diameter that it is necessary to press fit or otherwise secure the bar 19 therein in proper position as clearly illustrated at Fig. 10.

The frame leaf fingers 17 are disc-shaped, centered on a common axis and spaced in a manner which positions them between the temple leaf fingers 16. These fingers 17 are each attached to the hinge leg 13 to outstand in unison from one side thereof with the connections reinforced by fillets 18 the same as the temple leaf fingers 16. An orifice 23 axially extends through each of the frame leaf fingers 17 and is of the same diameter as the width of bar 19 and rotatably embraces the bar 19 when the hinge leaves are interconnected and the movement of the bar 19 within the orifice 23 defines the rotatable action of the hinge.

The inner edges of the fingers 17, with respect to the hinge leg 13 are slotted with mutually aligned slots 24 of the thickness of the bar 19, with the center of each slot 24 located in a vertical plane intersecting the axis of the orifice 23 and with the sides of the slot inclined slightly from parallelism with the adjacent surface of the leg 13, towards said surface of the leg. This inclination of the slots 24 with respect to their leg 13 on the frame 10 combined with the parallelism of the bar 19 with respect to its leg 13 on the temple 11, as illustrated, requires that the leaf legs 13 of each hinge be moved together from a position substantially at right angles when the temple is normally open, thence to a position substantially in spaced parallelism when the temple is normally closed by touching the frame, Fig. 1, and thence to a position beyond the normally closed position of the temple for separation of the hinge as hereinafter described, Fig. 7.

It follows that the interconnecting of the frame leaf fingers with the disc leaf fingers is accomplished by movement of the fingers together with the portions of the bar 19 between the disc leaf fingers entering the slots 24, and that the legs 13 of the two leaves must converge from the fingers at an inclination permitting the bar 19 to move into the slots as clearly illustrated at Fig. 6. It follows that the temple 11 must be sprung beyond its normal folded position which is determined by engagement of the temple end with the frame when the temple is swung against the frame as illustrated in Fig. 1, to attain this aligning convergence and to a bowed position substantially as illustrated at Fig. 7. The advantage of such arrangement is obvious in that a definite springing effort is required to position the temple for installation or removal and accidental disengagement of the temple is virtually impossible.

It is desirable that the fingers 17 fit snugly between the fingers 16 and that the orifice 23 snugly embrace the bar 19, all to provide a frictionally tight hinge fit so that the temple 11 will not swing upon the frame in a loose, sloppy manner, even after use of the glasses for an extensive period of time. It is inevitable that wear will occur at the hinge and it is desirable that the fit not only be tight, but also of a resilient character to take up wear which will occur over a substantial period of time. A tight fit may be accomplished by providing fingers 17 which are slightly wider than the space between fingers 16 to permit the natural resilience of the hinge metal to take up the wear. A desirable metal for this purpose is tempered beryllium copper, although many other metal alloys are also suitable.

A resiliently tight fit of the inter-meshing fingers may be accomplished in other ways. For example, one of the flat disk-shaped fingers 17 may be slightly distorted as at 17' in Fig. 11, and will spring flat when intermeshed between mating fingers 16. Another expedient is to place a very small spring washer 26, as shown in Fig. 12, in a suitable space between adjacent fingers. Regardless of the manner of accomplishing the tight fit, the fingers 17 must be forced between the fingers 16 and about the bar 19 to connect the temple and front frame with substantial pressure. To facilitate this forced connection, the forward edges of the fingers 17 are tapered as at 25 in Fig. 8, so they may be guided into the spaces between fingers 16 which must be slightly narrower than fingers 17 if the fit is at all tight.

While we have described many constructions and modifications which fully disclose the invention, it is obvious that others skilled in the art can devise alternate and equivalent constructions which are within the scope and spirit of the invention, hence it is our desire that our protection be limited, not by the constructions illustrated and described but only by the proper scope of the appended claims.

We claim:

1. A separable hinge for an eyeglass frame having a lens holding front frame and a temple, said hinge being adapted to attach the temple to the front frame and comprising a leaf affixed to the front frame and a leaf affixed to the temple, a pintle having flattened sides carried by one leaf and a finger on the other leaf adapted to pivotally engage said pintle, said finger being provided with a circular orifice having a slot at one side thereof through which the pintle may pass for separation of the hinge leaves with the temple swung about the front frame to a position aligning the flat sides of the pintle with the slot, said hinge being adapted to hold the temple at an open position substantially at right angles to the front frame and move the temple to a closed position by swinging the temple against the front frame and to permit movement of the temple beyond the closed position by flexing the temple, said slot being located on the finger in a vertical plane intersecting the axis of said orifice and inclined inwardly toward the front frame from parallelism therewith at said closed position of the temple and the flattened sides of said pintle being located with respect to its leaf at positions which bring them in alignment with said slot for separation of the hinge when the temple is flexed to the position beyond the closed position.

2. An eyeglass frame including, in combination, a lens-holding front frame, a temple pivotally carried at a side thereof and a separable hinge for attaching the temple to said front frame, said hinge comprising a leaf affixed to the temple and a leaf affixed to the front frame, a pintle having flattened sides carried by one leaf and a finger on the other leaf adapted to pivotally engage said pintle, said finger being provided with a circular orifice having a slot at one side thereof through which the pintle may pass for separation of the hinge leaves with the temple swung about the frame to a position aligning the flattened sides of the pintle with the slot, said temple being adapted to move from an open position substantially at right angles to the front frame to a closed position by swinging the temple against the front frame and to move beyond said closed position by flexing the temple, said slot being located on the finger in a vertical plane intersecting the axis of said orifice and inclined inwardly toward the front frame and from parallelism therewith at said closed position of the temple and the flattened sides of said pintle being located with respect to its leaf at positions which bring them into alignment with said slot for separation of the hinge when the temple is flexed to the position beyond the closed position requiring positive flexing of the temple to attain said position of separation.

3. An eyeglass frame including in combination, a lens-holding front frame, a flexible temple, a separable hinge for pivotally attaching said temple to said frame at one side thereof, said temple being movable from an open position substantially at right angles to said frame to a closed position substantially parallel to said frame, a portion of said temple remote from said hinge engaging said frame when in closed position and normally preventing further closing movement of said temple, said hinge comprising a leaf fixed to said frame and a leaf fixed to said temple, a pintle having flat opposite sides carried by one leaf, a finger on the other leaf, said finger having a circular aperture for receiving said pintle to pivotally mount said temple on said frame, said finger having a slot disposed in a vertical plane in one side of said finger, said slot being located in a plane intersecting the axis of said aperture, said pintle being movable into or out of said aperture through said slot when the flat sides of said pintle are in alignment with said slot, the plane of said slot and the flat sides of said pintle being displaced angularly with respect to each other in all positions of said temple between open and closed position to maintain said temple connected to said frame, said pintle in the closed position of said temple being located within said aperture and with the flat sides out of alignment with said slot whereby pivotal movement of said temple beyond said closed position to flex said temple will move the flat sides of said pintle into alignment with said slot to permit movement of said pintle through said aperture.

References Cited in the file of this patent

UNITED STATES PATENTS

| | | |
|---|---|---|
| 770,595 | Lovette | Sept. 20, 1904 |
| 932,978 | Frost | Aug. 31, 1909 |
| 1,494,193 | Simon | May 13, 1924 |
| 1,845,582 | Courtright | Feb. 16, 1932 |
| 2,484,581 | Pallmen | Oct. 11, 1949 |
| 2,526,458 | Bronnenkant | Oct. 17, 1950 |
| 2,555,473 | Deaton | June 5, 1951 |
| 2,671,379 | Eloranta | Mar. 9, 1954 |